US012558683B2

(12) United States Patent
McIntyre et al.

(10) Patent No.: US 12,558,683 B2
(45) **Date of Patent: \*Feb. 24, 2026**

(54) SYSTEMS AND METHODS FOR CELLULAR SEPARATION

(71) Applicant: ARTHREX, INC., Naples, FL (US)

(72) Inventors: Hannah McIntyre, Naples, FL (US);
Christopher Bare, Naples, FL (US);
Melissa Tucker, Estero, FL (US);
Andrea Matuska, Naples, FL (US)

(73) Assignee: Arthrex, Inc., Naples, FL (US)

( * ) Notice: Subject to any disclaimer, the term of this patent is extended or adjusted under 35 U.S.C. 154(b) by 775 days.

This patent is subject to a terminal disclaimer.

(21) Appl. No.: 17/901,425

(22) Filed: Sep. 1, 2022

(65) Prior Publication Data

US 2022/0410144 A1 Dec. 29, 2022

Related U.S. Application Data

(63) Continuation of application No. 16/990,261, filed on Aug. 11, 2020, now Pat. No. 11,458,468, which is a continuation of application No. 15/858,077, filed on Dec. 29, 2017, now Pat. No. 10,744,500.

(51) Int. Cl.
*B01L 3/00* (2006.01)
*B01D 21/26* (2006.01)

(52) U.S. Cl.
CPC .............. *B01L 3/502* (2013.01); *B01D 21/26* (2013.01); *B01L 3/50* (2013.01); *B01L 3/508* (2013.01); *B01L 3/523* (2013.01); *B01L 2200/0631* (2013.01); *B01L 2200/0689* (2013.01); *B01L 2200/141* (2013.01); *B01L*

*2300/042* (2013.01); *B01L 2300/044* (2013.01); *B01L 2300/048* (2013.01); *B01L 2300/049* (2013.01); *B01L 2300/0832* (2013.01); *B01L 2300/123* (2013.01); *B01L 2300/14* (2013.01); *B01L 2400/0409* (2013.01)

(58) Field of Classification Search
None
See application file for complete search history.

(56) References Cited

U.S. PATENT DOCUMENTS

| | | | |
|---|---|---|---|
| 2,894,510 A | 7/1959 | Bellamy | |
| 3,205,889 A | 9/1965 | Alder et al. | |
| 4,456,200 A * | 6/1984 | Ariniello | G11B 15/16 |
| 4,465,200 A | 8/1984 | Percarpio | |

(Continued)

FOREIGN PATENT DOCUMENTS

WO WO-2017093048 A1 * 6/2017 ........... B01L 3/5082

OTHER PUBLICATIONS

International Search Report for corresponding PCT application No. PCT/US18/67110, dated Feb. 8, 2019.

(Continued)

*Primary Examiner* — Matthew D Krcha
(74) *Attorney, Agent, or Firm* — Lisa Hillman; Lathrop GPM LLP

(57) ABSTRACT

Methods and systems disclosed herein provide systems and methods for maintaining sterile conditions inside of a biological-fluid container during an entire process of delivery, incubation, centrifugation, and extraction of fluid. The methods and systems also provide systems and methods for localized extraction of a portion of a biological fluid.

20 Claims, 5 Drawing Sheets

(56) References Cited

U.S. PATENT DOCUMENTS

| | | | | |
|---|---|---|---|---|
| 5,279,550 | A | 1/1994 | Habib et al. | |
| 8,460,227 | B2 | 6/2013 | Bare et al. | |
| 2002/0130100 | A1* | 9/2002 | Smith | B01L 3/50825 |
| | | | | 220/259.2 |
| 2009/0176301 | A1 | 7/2009 | Oldenberg et al. | |
| 2010/0140182 | A1 | 6/2010 | Chapman et al. | |
| 2012/0122649 | A1 | 5/2012 | Chapman et al. | |
| 2012/0128552 | A1 | 5/2012 | Chapman et al. | |
| 2012/0193274 | A1 | 8/2012 | Chapman et al. | |
| 2013/0045852 | A1 | 2/2013 | Chapman et al. | |
| 2013/0327688 | A1* | 12/2013 | Chapman | B01D 21/34 |
| | | | | 210/123 |
| 2015/0147300 | A1 | 5/2015 | Woddell-May et al. | |
| 2015/0367064 | A1 | 12/2015 | Pennie | |
| 2018/0050063 | A1 | 2/2018 | Woddell-May et al. | |
| 2021/0236544 | A1 | 8/2021 | Woddell-May et al. | |

OTHER PUBLICATIONS

Instructions for Use—Arthrex IRAP (TM) II Autologous Blood Processing System, Ref #: VLI1-0010-EN_F, Revision Date: Jun. 7, 2017, 4 pages, © 2017, Arthrex, Inc.

Extended European Search Report for EP application No. 18894585.1, dated Aug. 18, 2021, 9 pages.

* cited by examiner

124

130

134

104

114

E                    E

106

108

INJECT          WITHDRAW

180

182

SYSTEMS AND METHODS FOR CELLULAR SEPARATION

CROSS REFERENCE TO RELATED APPLICATIONS

This application is a Continuation of U.S. application Ser. No. 16/990,261, filed Aug. 11, 2020, which is a Continuation of U.S. application Ser. No. 15/858,077, filed Dec. 29, 2017, now U.S. Pat. No. 10,744,500, issued Aug. 18, 2020 which are incorporated by reference herein in their entireties.

BACKGROUND

The disclosure herein generally relates to cellular-separation systems and, more particularly, to caps for biological-fluid containers of cellular-separation systems.

SUMMARY

Typical cellular-separation systems allow for insertion of biological fluid into a biological-fluid container and extraction of a portion of the biological fluid from the biological-fluid container. However, current cellular-separation systems have various drawbacks. For instance, existing systems do not always allow for maintaining sterile conditions inside of the biological-fluid container during the entire process of delivery, incubation, centrifugation, and extraction of fluid from the biological-fluid container. Further, it is difficult and/or not possible in existing systems to reach particular points within the biological-fluid container for localized extraction of a portion of a biological fluid.

Methods and systems in accordance with the present disclosure provide systems and methods for maintaining sterile conditions inside of a biological-fluid container during an entire process of delivery, incubation, centrifugation, and extraction of fluid. Methods and systems in accordance with the present disclosure also provide systems and methods for localized extraction of a portion of a biological fluid.

In an example, a cap for a biological-fluid container is described. A cap includes an injection port configured for injection of biological fluid through the injection port and an extraction port configured for extraction of biological fluid through the extraction port. A cap can also include an injection-port cap configured to attach to the injection port and an extraction-port cap configured to attach to the extraction port, wherein at least one of the injection-port cap or the extraction-port cap is a vented cap. Further, a cap can include a penetrable flexible seal configured for insertion and extraction of biological fluid through the flexible seal.

In another example, a cellular-separation system is described. A cellular-separation system includes a biological-fluid container and a cap attached to the biological-fluid container. A cap can include an injection port configured for injection of biological fluid through the injection port and an extraction port configured for extraction of biological fluid through the extraction port. A cap can also include an injection-port cap configured to attach to the injection port and an extraction-port cap configured to attach to the extraction port, wherein at least one of the injection-port cap or the extraction-port cap is a vented cap. Further, a cap can include a penetrable flexible seal configured for insertion and extraction of biological fluid through the flexible seal.

In another example, a method to isolate one or more fractions of a biological fluid is described. A method includes injecting a biological fluid into a biological-fluid container through an injection port in a cap of a cellular-separation system in accordance with the present disclosure, wherein the injection port is configured to attach to a vented cap. A method can also include incubating a biological fluid injected into a biological-fluid container and centrifuging the biological-fluid container to form two or more fractions of the biological fluid. Further, a method can include removing (e.g., via a needle) one or more fractions of the biological fluid from the biological-fluid container through the penetrable flexible seal in the cap, wherein during said removing the vented cap is attached to the injection port and releases pressure from the biological-fluid container.

The features, functions, and advantages that have been discussed can be achieved independently in various embodiments or can be combined in yet other embodiments further details of which can be seen with reference to the following description and drawings.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein.

As mentioned above, current cellular-separation systems have various drawbacks. Methods and systems in accordance with the present disclosure provide methods and systems for allowing for maintenance of sterile conditions inside of a biological-fluid container during the entire process of delivery, incubation, centrifugation, and extraction of biological fluid(s) from the biological-fluid container. Furthermore, methods and systems in accordance with the present disclosure also provide systems and methods for localized extraction of a portion of a biological fluid from the biological-fluid container.

Figure 1A:
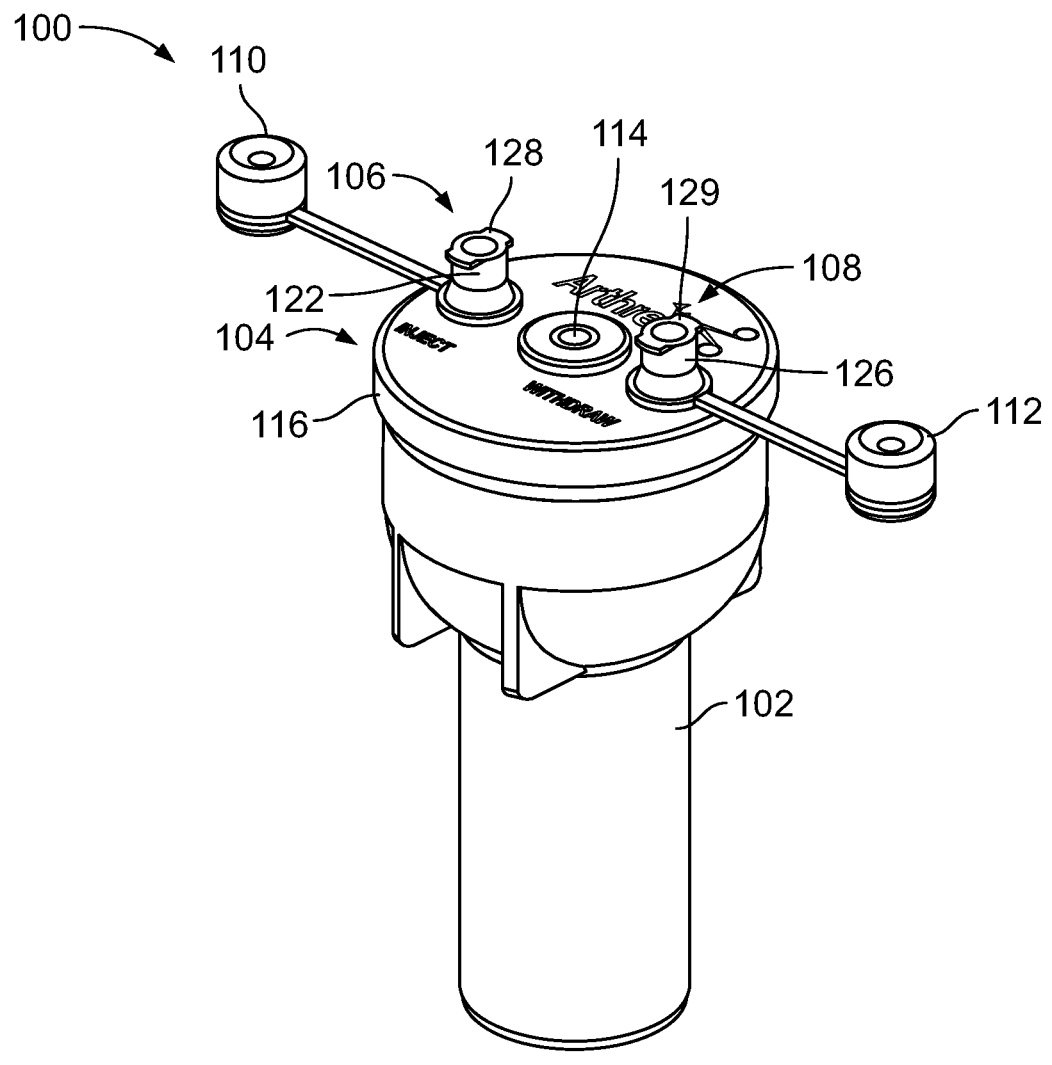
FIG. 1a illustrates a perspective view of an example cellular-separation system, according to an example embodiment.
Figure 1B:
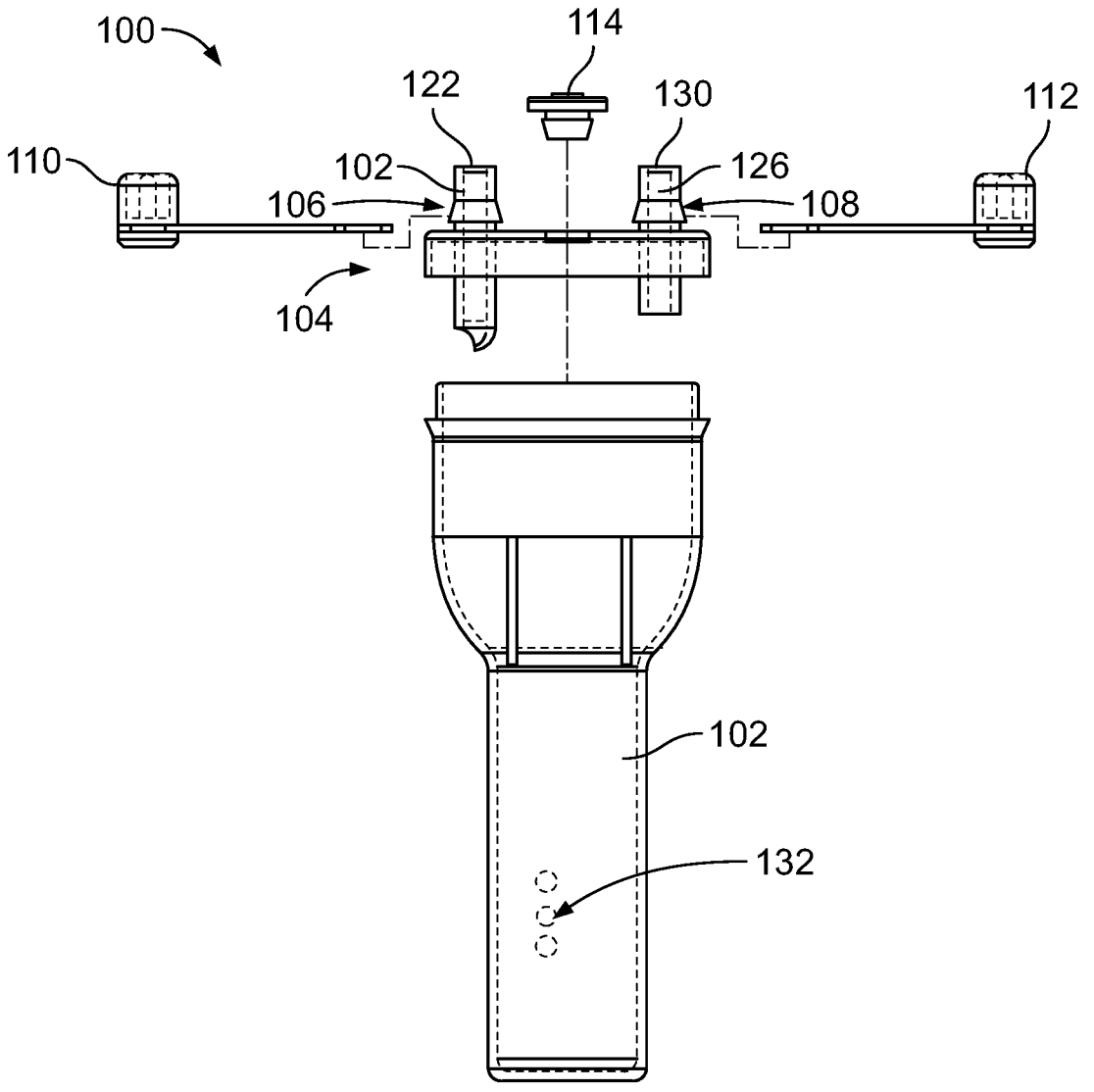
FIG. 1b illustrates an exploded, side view of the example cellular-separation system of FIG. 1a, according to an example embodiment.

Referring now to FIGS. 1*a-b*, an example cellular-separation system 100 is illustrated. The cellular-separation system 100 includes a biological-fluid container 102 and a cap 104 attached to the biological-fluid container 102. The cap includes an injection port 106 to allow for injection of biological fluid through the injection port and an extraction port 108 to allow for extraction of biological fluid through the extraction port. The cap 104 also includes an injection-port cap configured to attach to the injection port 106 and an extraction-port cap configured to attach to the extraction port 108, wherein at least one of the injection-port cap or the extraction-port cap is a vented cap. In this example of FIGS. 1*a-b*, the injection-port cap is first vented cap 110 and the extraction-port cap is second vented cap 112. Further, the cap 104 includes a penetrable flexible seal 114 to allow for insertion and extraction of biological fluid through the penetrable flexible seal.

Any suitable materials can be used for these components of the cellular-separation system 100 including but not limited to plastic, rubber, and/or metal. In an example embodiment, the biological-fluid container 102, injection port 106, extraction port 108, first vented cap 110, and second vented cap 112 comprise a medical-grade plastic, such as polypropylene. Other materials are possible as well. Further, in an example embodiment, the penetrable flexible seal 114 comprises a rubber such as bromobutyl or polyisoprene. As a general matter, the penetrable flexible seal 114 comprises a seal that can be penetrated by an instrument (e.g., a needle) and can maintain a hermetic seal when that instrument is removed. In an example embodiment, the penetrable flexible seal 114 is a rubber stopper or gasket. Other example penetrable flexible seals and materials are possible as well.

The cap 104 includes a base 116 configured to attach to the biological-fluid container 102. In an example embodiment, the base 116 includes threads to attach to corresponding threads on the biological-fluid container 102. Additionally or alternatively, the base 116 is attached to the biological-fluid container 102 with an adhesive. In an example embodiment, the base 116 is welded to the biological-fluid container 102. Other examples are possible as well. The cap 104 provides a hermetic seal for the biological-fluid container 102 when the base 116 is attached to the biological-fluid container.

Figure 1C:
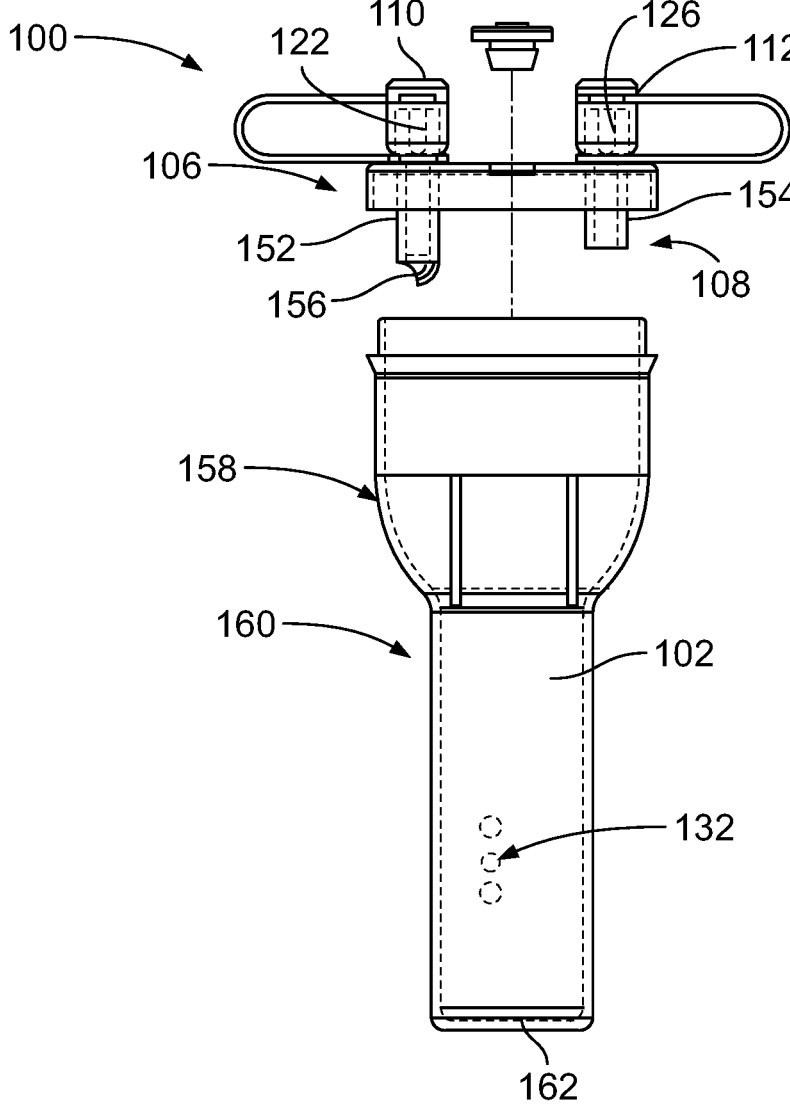
FIG. 1c illustrates another exploded, side view of the example cellular-separation system of FIG. 1a when the vented caps are attached to the injection and extraction ports, according to an example embodiment.
Figure 2:
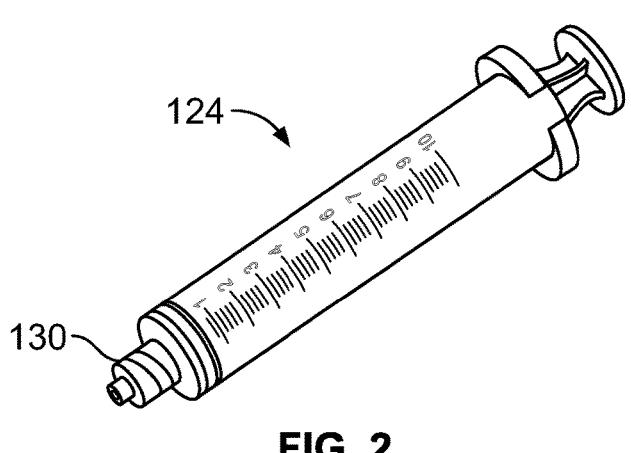
FIG. 2 illustrates an example syringe that can be used for injection and/or extraction of a biological fluid from the example cellular-separation system of FIG. 1a, according to an example embodiment.

The injection port 106 includes a connection fitting 122 configured to attach directly to a syringe, such as syringe 124 shown in FIG. 2. The connection fitting 122 is also configured to attach to the first vented cap 110 as shown in FIG. 1*c*. Similarly, the extraction port 108 includes a connection fitting 126 configured to attach directly to a syringe such as syringe 124. The connection fitting 126 is also configured to attach to the second vented cap 112 as shown in FIG. 1*c*.

In an example embodiment, the syringe 124 includes a male luer lock 130 and the vented caps 110, 112 are vented male luer caps, whereas connection fittings 122, 126 are female luer locks. In other examples, however, the connection fittings 122, 126 are male luer locks, whereas the syringe 124 includes a female luer lock and the vented caps 110, 112 are vented female luer locks. Other examples are possible as well.

In an example embodiment, the connection fitting 122 includes threading 128 (see FIG. 1*a*) to accommodate the first vented cap 110 and syringe 124, and connection fitting 126 includes threading 129 (see FIG. 1*a*) to accommodate second vented cap 112 and syringe 124. This threading allows the syringe 124 or the vented caps 110, 112 to be twisted on the injection port 106 and extraction port 108 during the connection process.

In the example of FIGS. 1*a-c*, the first vented cap 110 is tethered to the injection port-106 and the second vented cap 112 is tethered to the extraction port 108. This tethering helps to ensure that the vented caps 110, 112 remained attached to the cap 104 and are not misplaced when the vented caps 110, 112 are detached from the ports 106, 108 (e.g., in order to attach syringe 124 to ports 106, 108). However, in other examples, the vented caps 110, 112 can be standalone caps that are not tethered to the ports 106, 108.

In operation, the cellular-separation system 100 can be used for separating components of biological fluid (e.g., separating autologous cells or tissues from blood). In an example embodiment, the cellular-separation system 100 includes an element(s) designed to isolate or concentrate the desired component(s). For instance, in the example shown in FIGS. 1*a-c*, the cellular-separation system 100 includes a plurality of beads 132 in the biological-fluid container 102 to activate Interleukin-1 Receptor Antagonist Protein (IL-1Ra) production in blood. Other examples are possible as well. Further, although three beads 132 are illustrated, more or fewer beads are possible as well (e.g., about 5, 10, 20, 30, 40, 50, or higher).

In an example embodiment, the beads 132 are manufactured from a glass like composition such as, borosilicate glass, alumina, silicate, quartz, bioglass, ceramic glass, flint glass, fluorosilicate glass, phosphosilicate glass, and cobalt glass or conundrum. In an example embodiment, the beads have a spherical shape to provide for a maximum surface area for blood contact. In an alternate embodiment, the biological-fluid container 102 can contain gels, wool, powder, plastic, granules or fibers. The beads can be provided with a coating to maximize the production of IL-1Ra by monocytes within blood. The coating can be silane, surfactants, polyether, polyester, polyurethane, or polyol groups. The beads can range in size from 0.1-5 mm; however, other sizes are possible as well. In a particular example, the beads 132 are about 3.0 mm. Optimal production of IL-1Ra occurs when the maximum surface area of the beads is exposed to the blood within the biological-fluid container 102. A maximum amount of blood in the biological-fluid container 102 helps to optimize the production of IL-1Ra. In order to accomplish both goals, the volume of the beads should be minimized to accomplish the maximum exposed surface area. Accordingly, the diameter of the beads has been tailored to maximize the volume of injected blood or biological fluid in the container and maximize the surface area for blood/bead contact.

Figure 7:
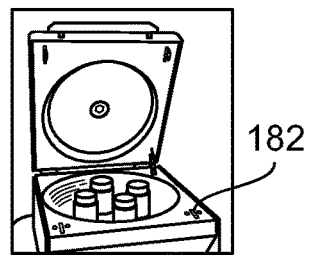
FIG. 7 illustrates an example centrifuge that can be used to centrifuge the cellular-separation system of FIG. 1a, according to an example embodiment.
Figures 3A, 3B:
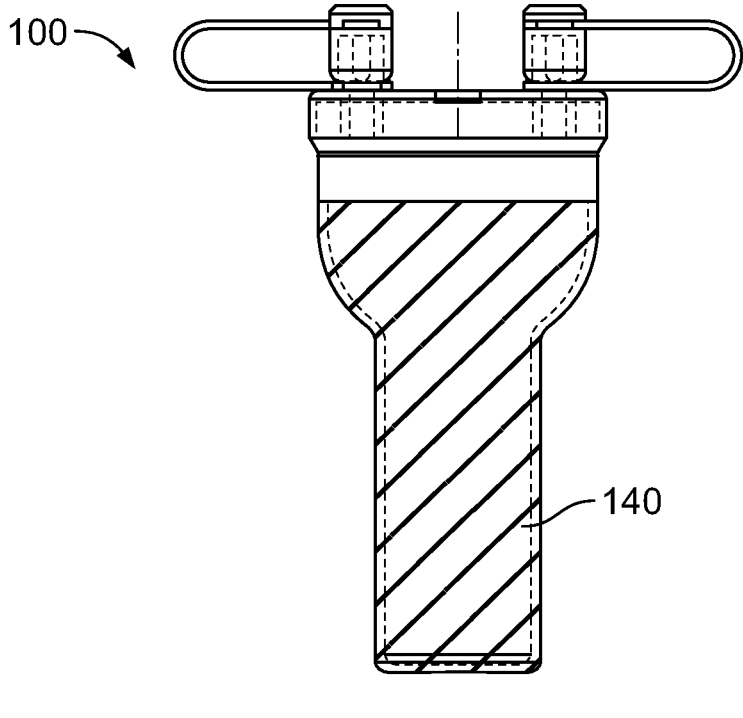
FIG. 3a illustrates a cross-sectional, side view of the example cellular-separation system of FIG. 1a after insertion of a biological fluid, according to an example embodiment.
FIG. 3b illustrates a cross-sectional, side view of the example cellular-separation system of FIG. 1a after incubation and centrifugation, according to an example embodiment.

After a biological fluid is injected into the biological-fluid container 102 optionally with beads 132, the biological fluid can be incubated for an appropriate period of time. In an example embodiment, the biological fluid is incubated for a sufficient time and at a sufficient temperature to produce a therapeutically active protein in the biological fluid. After incubation, the biological fluid can be placed into a centrifuge (e.g., such as centrifuge 182 shown in FIG. 7) to separate components of the biological fluid into two or more fractions. For instance, FIG. 3*a* illustrates cellular-separation system 100 with biological fluid 140 in the biological-fluid container 102 prior to incubation and centrifugation, and FIG. 3*b* illustrates cellular-separation system 100 after incubation and centrifugation. The biological fluid 140 can be a biological fluid from a mammal, e.g., blood. In one example, as seen by comparing these Figures, after incubation and centrifugation, the biological fluid (in this case blood 140) can be separated into a serum fraction 142 and a fraction of the remainder 144 of the blood 140. As the beads 132 (see FIG. 1*b*) within the biological-fluid container can be designed to activate IL-1Ra production in blood, the serum fraction 142 can have increased anti-inflammatory and regenerative protein concentration levels. The serum fraction 142 can then be extracted from the biological-fluid container and can be used for treatment (e.g., treatment of a tissue injury in the mammal from which blood 140 was extracted).

Beneficially, the cap 104 provides numerous ways to both (i) inject biological fluid into the biological-fluid container 102 and (ii) extract the biological fluid (and particularly desired components of that biological fluid, such as serum 142) from the biological-fluid container 102. More particularly, the cap 104 allows for injection and extraction of the biological fluid via a needle, as well as for a direct syringe attachment for injection and extraction of biological fluid. By providing these numerous ways to both inject and extract the biological fluid, both insertion and extraction of the biological fluid can be tailored based on the particular application and/or cellular components being separated. In practice, some applications can be better suited for insertion and/or extraction via a direct syringe attachment, whereas other applications can be better suited for insertion and/or extraction via a needle. Further, by providing both the penetrable flexible seal 114 and the vented caps 110, 112 in the cap 104, the cap 104 can allow for maintenance of sterility inside of the biological-fluid container throughout the entire delivery, incubation, centrifugation, and extraction process. The sterility can be important where incubation periods are long (e.g., about 6, 8, 12, 24, 36 or 48 hours) at temperatures conducive to microbial growth and multiplication.

The first and second vented caps 110, 112 are configured to release pressure from the biological-fluid container 102 during at least one of insertion or extraction of biological fluid through the penetrable flexible seal 114 via a needle. The vented caps 110, 112 help to provide proper air pressure so as to allow for the insertion and extraction of the biological fluid (e.g., blood 140 or serum 142) through the penetrable flexible seal 114 via a needle. The vented caps 110, 112 can include one-way release valves that are pressure activated. When the pressure reaches a threshold level, the release valves can open to allow venting. In an example embodiment, the threshold level is about 5 pounds per square inch (psi). However, in other examples, the threshold can be higher or lower than about 5 psi (e.g., about 3, 4, 5, 6, 7, 8 psi). The vented caps 110, 112 can include a plurality of pores that are sized to allow air to flow through the pores but prevent the biological fluid from flowing through the pores. In an example embodiment, the size of the pores ranges between 0.2-10 μm (e.g., about 0.2, 0.45, 1.2, 3, 10 μm). Other sizes are possible as well. Since the biological-fluid container 102 is a pressurized container when hermetically sealed by cap 104, it would be difficult to inject into or extract fluid from the container without the venting provided by vented cap 110 and/or vented cap 112.

Figure 4:
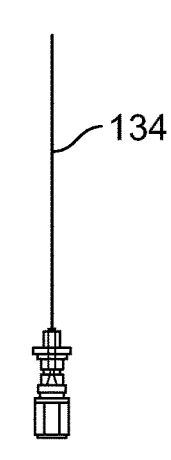
FIG. 4 illustrates an example needle that can be used for injection and/or extraction of a biological fluid from the example cellular-separation system of FIG. 1a, according to an example embodiment.

In order to insert and/or extract biological fluid via a needle, such as needle 134 (see FIG. 4), the needle 134 can puncture the penetrable flexible seal 114 and be inserted into the biological-fluid container 102. Since both insertion and extraction of biological fluid through the penetrable flexible seal 114 are possible, sterility can be maintained inside of the biological-fluid container throughout the entire delivery, incubation, centrifugation, and extraction process. Additionally, in an example embodiment, needle 134 can also be inserted through the vented caps 110, 112 for insertion and/or extraction of biological fluid through the vented caps 110, 112. In this example, vented caps 110, 112 can include a penetrable filter that provides venting and also allows for insertion of needle 134. Any suitable materials can be used for the penetrable filter including but not limited to acrylic copolymer, polytetrafluoroethylene (PTFE), nylon, polyurethane, and/or polyethersulfone. Other materials are possible as well. These penetrable filters of vented caps 110, 112 can also help to maintain sterility inside of the biological-fluid container throughout the entire delivery, incubation, centrifugation, and extraction process.

As mentioned above, the cap 104 also allows for a direct syringe attachment for injection and extraction of biological fluid. In particular, vented caps 110, 112 can be detached from the injection port 106 and extraction port 108, respectively (as shown in FIGS. 1*a-b*), and syringe 124 can then be directly attached to the ports 106, 108 for insertion and extraction of biological fluid. In an example embodiment, direct syringe attachment can be suitable for large volume aspirations, when a needle is unavailable, and/or when a needle is unwanted due to disposal concerns.

In an example embodiment, the injection port 106 and extraction port 108 include cannulas or conduits configured to extend into the biological-fluid container 102. For instance, as shown in FIG. 1*c*, injection port 106 includes cannula 152 extending into the biological-fluid container 102, and extraction port 108 includes cannula 154 extending into the biological-fluid container 102. These cannulas 152, 154 help with the insertion and extraction of biological fluid using syringe 124. A cannula 152 can include a beveled edge 156 that can help to direct the flow of biological fluid towards the sidewall 158 of the tubular body 160 of the container (rather than allowing the fluid to flow directly to the bottom 162. This beveled edge 156 can help to prevent hemolysis. Further, by extending into the biological-fluid container 102, a cannula 154 can help with the extraction of biological fluid by a direct syringe attachment. For instance, a cannula 152 can extend into serum 142 (as is the case in FIG. 3*b*), and this extension into serum 142 can help syringe 124 suction serum 142 from the biological-fluid container 102 to the syringe 124. In an example, cannula 154 can also include a beveled edge.

The biological-fluid container 102 can include a tubular body. However, in other examples embodiments, other shapes of the body are possible as well. In general, the biological-fluid container 102 has a size and shape that allows the biological-fluid container 102 to fit into a centrifuge. In an example, the biological-fluid container can 102 hold a volume of about 50 ml to about 60 ml although it could be any size that would fit within a centrifuge.

In addition to allowing for maintaining sterile conditions inside of a biological-fluid container throughout the entire delivery, incubation, centrifugation, and extraction process, the penetrable flexible seal 114 also beneficially allows for a means of extraction that provides a greater range of maneuvering to facilitate extraction compared to means of extraction in existing cellular-separation systems. For instance, the needle 134 can be inserted to substantially any level within the biological-fluid container 102 to extract any fraction or portion of the biological fluid prior to or after centrifugation. Further, the orientation (e.g., angle) of the needle 134 can be adjusted so that the needle 134 is able to reach all or substantially all of the points within the biological-fluid container 102. For instance, the needle 134 can be inserted to a given depth and can be swiveled about the axis of the penetrable flexible seal 114 so as to reach all or substantially all of the points within the biological-fluid container 102.

As a particular example, with reference to FIG. 3b, the needle 134 can be inserted to the level of serum 142 for extraction of serum 142. Further, both the angle and depth of the needle 134 can be adjusted, so as to allow the needle to reach localized points within the serum fraction 142 or within any other portion or fraction of the biological fluid. For instance, the biological-fluid container 102 can include sidewalls 158, 166, and the serum fraction 142 (for example) can include a proximal point 168 and a distal point 170. The angle and depth of the needle 134 can be adjusted to reach the proximal and distal points of both sidewalls 158, 166, as well as points there between. In an example, the needle 134 may be prevented from reaching points directly between cannula 152 (if present) and sidewall 158 and between cannula 154 (if present) and sidewall 166; however, all or most of the other points in the biological-fluid container 102 can be reached.

Although in the example of FIG. 3b the biological fluid is illustrated as being separated into two fractions, in other examples the biological fluid can be separated into 3, 4, 5, 6, or more fractions. The needle 134 can be inserted into the biological-fluid container 102 to any fraction of any component to be extracted.

In an example, whole blood can be fractionated into an erythrocyte layer, a buffy layer, and a platelet poor plasma (PPP) layer via centrifugation. A portion of the PPP fraction can be removed, and the remaining fluid can then be fractionated into other layers, such as an erythrocyte fraction and a plasma fraction (i.e., platelet rich plasma). In an embodiment, platelet rich plasma is removed from the biological-fluid container and administered to a subject.

In an example, bone marrow can be fractionated into a platelet poor plasma layer, a buffy layer, and an erythrocyte/granulocyte layer within the biological-fluid container via centrifugation. Optionally, at least a portion of the platelet poor plasma layer can be removed from the biological-fluid container. The platelet poor plasma layer and the buffy layer can be centrifuged wherein the platelet poor plasma layer and the buffy layer fractionates into a bone marrow mononuclear cell fraction and an erythrocyte/granulocyte fraction. The bone marrow mononuclear cell fraction can be removed from the biological-fluid container and administered to a subject.

In an example, adipose tissue can be fractionated (top to bottom) into a lipid layer, a compressed adipose layer, and an excess fluid layer within the biological-fluid container via centrifugation. At least a portion of the lipid layers and excess fluid layers can be removed from biological-fluid container. The fluid can be centrifuged again such that the fluid fractionates into a top adipocyte layer and a bottom stromal vascular fraction. The stromal vascular fraction can be removed from the biological-fluid container and used in the treatment of soft tissue injury or damage. Other examples are possible as well.

As mentioned above, needle 134 can also be inserted through a first vented cap 110 and/or a second vented cap

112. Although needle 134 can be inserted through a vented cap 110, the range of motion of the needle 134 can be limited by the structure of the vented cap 110 and/or cannula 152 of the injection port 106. Similarly, although needle 134 can be inserted through the second vented cap 112, the range of motion of the needle 134 can be limited by the structure of the second vented cap 112 and/or cannula 154 of the extraction port 108. On the other hand, the penetrable flexible seal 114 allows for a greater range of movement of the needle 134 within the biological-fluid container 102, thus allowing for localized extraction of the biological fluid from all or substantially all of the points within the biological-fluid container 102.

Figure 5:
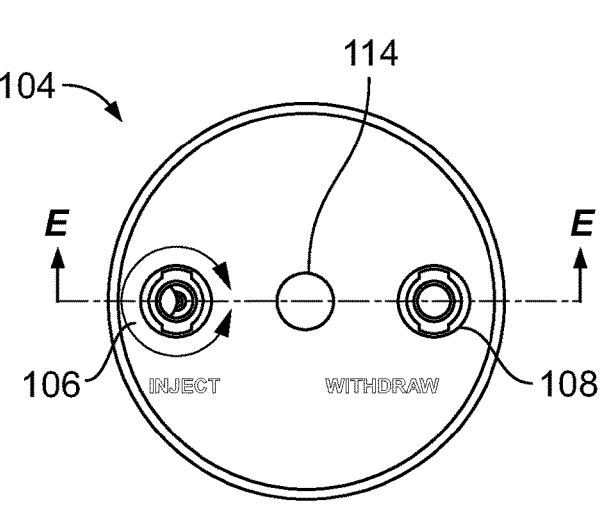
FIG. 5 illustrates a top view of the cap of the example cellular-separation system of FIG. 1a, according to an example embodiment.

The penetrable flexible seal 114 can be positioned on the cap 104 in any suitable location on the cap 104. In an example, the position of the penetrable flexible seal 114 on the cap 104 is selected so as to maximize the range of motion of the needle 134 when it is inserted into the penetrable flexible seal 114. With reference to FIG. 5, which illustrates a top view of the cap 104, the penetrable flexible seal 114 is positioned in the center or substantially in the center of the cap 104. This allows for a large range of motion for needle 134 when it is inserted into the penetrable flexible seal 114 to a desired depth and its orientation (e.g., angle) is adjusted for a desired localized extraction. However, other positions of the penetrable flexible seal 114 are possible as well. Furthermore, in other example embodiments, the cap 104 includes a plurality of penetrable flexible seals (e.g., about 2, 3, 4, 5, or more). The number and/or location of the plurality of penetrable flexible seals can be selected so as to maximize the reach of the needle 134 within the biological-fluid container 102.

Figure 6:
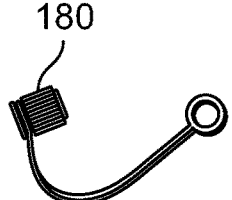
FIG. 6 illustrates an example non-vented cap that can be used in the example cellular-separation system of FIG. 1a, according to an example embodiment.

Although in the example of FIGS. 1a-c, the cap 104 includes vented caps on both the injection port 106 and extraction port 108, in other examples the cap 104 can include one vented cap for the injection port 106 or the extraction port 108. In this example, the other port can include a non-vented cap, such as non-vented cap 180 shown in FIG. 6. The single vented cap can provide the venting for injecting and extracting biological fluid through the penetrable flexible seal 114.

In an example embodiment, the penetrable flexible seal 114 (e.g., rubber stopper) can be removed so that other materials could be added to the biological-fluid container 102. For instance, in an example embodiment, a user can pull a rubber stopper out of the cap 104 to expose a hole in which the rubber stopper was positioned, and then insert other materials (e.g., tissue or fluid(s)) and/or instruments (e.g., a blender or blending apparatus) into the biological-fluid container 102 through that hole.

In accordance with example embodiments, methods to isolate one or more fractions of a biological fluid are provided. An example method includes injecting biological fluid 140 into biological-fluid container 102 through injection port 106 in cap 104, wherein the injection port 106 is configured to attach to vented cap 110. The method also includes incubating the biological fluid 140 injected into the biological-fluid container 102 and centrifuging the biological-fluid container 102 to form two or more fractions 142, 144 of the biological fluid. Further, the method includes removing, via a needle 134, one or more fractions 142 of the biological fluid from the biological-fluid container 102 through the penetrable flexible seal 114 in the cap 104, wherein during said removing the vented cap 110 is attached to the injection port 106 and releases pressure from the biological-fluid container 102.

Another example method includes injecting blood 140 into biological-fluid container 102 through injection port 106 in cap 104. The injection port 106 is configured to attach to vented cap 110, and the biological-fluid container 102 has a plurality of beads 132 to activate a protein production in the blood 140. The method further includes incubating the biological-fluid container 102 for a sufficient time (e.g., about 6, 8, 12, 24, 36, 48 hours or more) and at a sufficient temperature (e.g. about 30, 32, 35, 37, 39, 40, or 45° C.) to produce a therapeutically active protein in the blood. The method also includes centrifuging the biological-fluid container 102 to form a serum 142 fraction containing the therapeutically active protein. The method also includes removing, via a needle 134, the serum fraction 142 from the biological-fluid container 102 through penetrable flexible seal 114 while leaving behind other fractions in the biological-fluid container 102. During said removing, the first vented cap 110 is attached to the injection port 106 and releases pressure from the biological-fluid container 102. In an example embodiment, the first vented cap 110 is attached to the injection port 106 during said injecting, and said injecting comprises injecting the biological fluid or blood 140 through the first vented cap 110 via needle 134.

In accordance with example embodiments, methods for covering a biological-fluid container of a cellular-separation system are provided. An example method includes providing a cap 104 including (i) an injection port 106 configured for injection of biological fluid through the injection port, (ii) an extraction port 108 configured for extraction of biological fluid through the extraction port, (iii) a first vented cap 110 configured to attach to the injection port 106, (iv) a second vented cap 112 configured to attach to the extraction port 108, and (v) a penetrable flexible seal 114 configured for insertion and extraction of biological fluid through the flexible seal. The method then includes attaching the cap 104 to a biological-fluid container 102 of the cellular-separation system 100.

In accordance with example embodiments, methods for inserting and extracting a biological fluid from a biological-fluid container of a cellular-separation system are provided. An example method includes inserting a biological fluid into a biological-fluid container 102 through a penetrable flexible seal 114 via a needle 134 or extracting a portion of a biological fluid through the penetrable flexible seal 114 via the needle 134. The method further includes venting the cellular-separation system 100 via at least one vented cap (e.g., first vented cap 110 and/or second vented cap 112) during the insertion or extraction of the biological fluid through the penetrable flexible seal 114 via the needle 134.

It should be understood that these methods are intended as examples and other processes and methods to isolate one or more fractions of a biological fluid, for covering a biological fluid of a cellular-separation system, and for inserting and extracting a biological fluid from a biological-fluid container of a cellular-separation system are disclosed herein. Alternative implementations are included within the scope of the examples of the present disclosure in which functions can be executed out of order from that discussed, including substantially concurrent or in reverse order, depending on the functionality involved, as would be understood by those reasonably skilled in the art.

The disclosed methods and systems described herein beneficially provide improved methods and systems for cellular separation. The disclosed methods and systems provide an improved cap for a biological-fluid container of a cellular-separation system. This improved cap beneficially allows for maintaining sterile conditions inside of a biological-fluid container during the entire process of delivery, incubation, centrifugation, and extraction of biological fluid from the biological-fluid container. Furthermore, this improved cap beneficially allows for an enhanced ability to localize particular points within the biological-fluid container for extraction. In particular, the penetrable flexible seal of the disclosed cap allows for a large range of motion of a needle inserted into the biological-fluid container. The range of motion is increased compared to existing systems, and beneficially allows for an improved ability to localize particular points within the biological-fluid container for extraction. The improved cap also allows for numerous insertion and extraction methods that can be tailored based on the particular application and/or component of biological fluid to be extracted.

By the term "substantially" it is meant that the recited characteristic need not be achieved exactly, but that deviations or variations, including for example, tolerances, measurement error, measurement accuracy limitations and other factors known to skill in the art, can occur in amounts that do not preclude the effect the characteristic was intended to provide.

Although the disclosed systems and methods are described primarily with reference to a system that isolates IL-1Ra production in blood, it should be understood that disclosed systems and methods can be used in conjunction with other biological fluids and for extraction of other components. For instance, the disclosed systems and methods can be implemented in systems configured to isolate any desired component(s) of any suitable biological fluid(s).

The term "biological fluid" refers to, including but not limited to, serum, plasma, vitreous fluid, lymph fluid, synovial fluid, follicular fluid, seminal fluid, amniotic fluid, milk, whole blood, fractionated blood, plasma rich platelets, bone marrow, urine, cerebro-spinal fluid, saliva, sputum, tears, perspiration, mucus, tumor lysates, and tissue culture medium, as well as tissue extracts such as homogenized tissue, tumor tissue, adipose tissue, and cellular extracts.

The description of the different advantageous arrangements has been presented for purposes of illustration and description, and is not intended to be exhaustive or limited to the embodiments in the form disclosed. Many modifications and variations will be apparent to those of ordinary skill in the art. Furthermore, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated. As used herein, the term "about" in association with a numerical value means that the value varies up or down by 5%. For example, for a value of about 100, means 95 to 105 (or any value between 95 and 105).

What is claimed is:

1. A cap for a biological-fluid container, the cap comprising:

an injection port configured for injection of biological fluid through the injection port;

an extraction port configured for extraction of biological fluid through the extraction port;

an injection-port cap configured to attach to the injection port;

an extraction-port cap comprising a filter configured to attach to the extraction port, wherein at least one of the injection-port cap or the extraction-port cap is a vented cap; and a penetrable flexible seal configured for insertion and extraction of biological fluid through the flexible seal.

2. The cap of claim 1, wherein the at least one vented cap is configured to release pressure from the biological-fluid container during insertion and extraction of biological fluid through the flexible seal via a needle.

3. The cap of claim 1, wherein the injection port and extraction port each include a cannula configured to extend into the biological-fluid container.

4. The cap of claim 1, wherein the injection port comprises a connection fitting configured to attach directly to a syringe or the injection-port cap, and wherein the extraction port comprises a connection fitting configured to attach directly to a syringe or the extraction-port cap.

5. The cap of claim 1, wherein the penetrable flexible seal comprises a rubber stopper.

6. The cap of claim 1, wherein the injection-port cap and the extraction-port cap are vented luer caps.

7. The cap of claim 1, further comprising a base configured to attach to the biological-fluid container.

8. The cap of claim 7, wherein the base is attached to the biological-fluid
container, and wherein the cap for a biological-fluid container provides a hermetic seal for the biological-fluid container.

9. The cap of claim 1, wherein the injection-port cap is tethered to the injection port, and wherein the extraction-port cap is tethered to the extraction port.

10. The cap of claim 1, wherein the injection port comprises threading to accommodate the injection-port cap, and wherein the extraction port comprises threading to accommodate the extraction-port cap.

11. A cellular-separation system comprising:

a biological-fluid container; and a cap attached to the biological-fluid container, wherein the cap comprises:

an injection port configured for injection of biological fluid through the injection port;

an extraction port configured for extraction of biological fluid through the extraction port;

an injection-port cap configured to attach to the injection port;

an extraction-port cap comprising a filter configured to attach to the extraction port, wherein at least one of the injection-port cap or the extraction-port cap is a vented cap; and a penetrable flexible seal configured for insertion and extraction of biological fluid through the flexible seal.

12. The cellular-separation system of claim 11, wherein the biological-fluid container comprises a tubular body.

13. The cellular-separation system of claim 11, further comprising a plurality of beads in the biological-fluid container.

14. The cellular-separation system of claim 13, wherein the plurality of beads are suitable to activate Interleukin-1-Receptor Antagonist Protein.

15. The cellular-separation system of claim 11, wherein the at least one vented cap is configured to release pressure from the biological-fluid container during insertion and extraction of biological fluid through the flexible seal via a needle.

16. The cellular-separation system of claim 11, wherein the cap for a biological-fluid container hermetically seals the biological-fluid container.

17. The cellular-separation system of claim 11, wherein the injection port And extraction port each include a cannula configured to extend into the biological-fluid container.

18. The cellular-separation system of claim 11, wherein the penetrable flexible seal comprises a rubber stopper.

19. The cellular-separation system of claim 11, wherein the injection-port cap and the extraction-port cap are both vented caps.

20. A method to isolate one or more fractions of a biological fluid, the method comprising:

injecting a biological fluid into a biological-fluid container through an injection port in a cap of the cellular-separation system of claim 11, wherein the injection port is configured to attach to a vented cap; incubating the biological fluid injected into the biological-fluid container; centrifuging the biological-fluid container to form two or more fractions of the biological fluid; and removing one or more fractions of the biological fluid from the biological-fluid container through the penetrable flexible seal in the cap, wherein during said removing the vented cap is attached to the injection port and releases pressure from the biological-fluid container.

* * * * *